United States Patent [19]

Eberhardt

[11] Patent Number: 4,817,000
[45] Date of Patent: Mar. 28, 1989

[54] AUTOMATIC GUIDED VEHICLE SYSTEM

[75] Inventor: Nikolai Eberhardt, Bethlehem, Pa.

[73] Assignee: SI Handling Systems, Inc., Easton, Pa.

[21] Appl. No.: 838,088

[22] Filed: Mar. 10, 1986

[51] Int. Cl.⁴ .......................... G06F 15/50; B62D 6/00
[52] U.S. Cl. ................................ 364/443; 364/424.02; 180/169; 180/167
[58] Field of Search ............... 364/424, 460, 443, 513; 180/167, 168, 169; 340/942

[56] References Cited

U.S. PATENT DOCUMENTS

| | | | |
|---|---|---|---|
| 3,009,271 | 11/1961 | Kuehne | 37/143 |
| 4,284,160 | 8/1981 | Deliban et al. | 180/168 |
| 4,309,758 | 1/1982 | Halsall et al. | 364/424 |
| 4,328,545 | 5/1982 | Halsall | 364/424 |
| 4,360,808 | 11/1982 | Smith, III | 340/825.69 |
| 4,465,155 | 8/1984 | Collins | 180/169 |
| 4,530,056 | 7/1985 | MacKinnon | 364/424 |
| 4,556,940 | 12/1985 | Katoo et al. | 180/168 X |
| 4,653,002 | 3/1987 | Barry | 340/942 |
| 4,691,385 | 9/1987 | Tupman | 455/607 |

FOREIGN PATENT DOCUMENTS 1173442 12/1969 United Kingdom .
1313928 4/1973 United Kingdom .

OTHER PUBLICATIONS

M. Julliere, L. Marce, H. Place, "A Guidance System For A Mobile Robot", 13th ISIR/Robots 7 Conference, Apr. 1983, Chicago, Ill.
C. Jorgensen, W. Hamel, C. Weisman, "Autonomous Robot Navigation", BYTE, vol. 11, pp. 223–235, Jan. 1986.
CAT Joins with British firm to develop AGVS, York Action Reporter, Jun. 1986.

Primary Examiner—Parshotam S. Lall
Assistant Examiner—Thomas G. Black
Attorney, Agent, or Firm—Seidel, Gonda, Goldhammer & Abbott

[57] ABSTRACT

Automatic guided vehicle system for guiding a driverless vehicle over a predetermined path of travel without any tracks, wires or the like. The vehicle is provided with an active optical navigation section for determining vehicle position and bearing by scanning plural beacons distributed within the zone of travel of the vehicle, a passive ground navigation section including a gyrocompass for measuring changes in bearing of the vehicle and a wheel encoder for measuring distance traveled by the vehicle's steering wheel. Memory onboard the vehicle contains a series of path vectors which define a predetermined path of travel for the vehicle. The ground navigation section updates vehicle position and bearing as determined by the optical navigation section. A programmed onboard computer includes driver software for generating steering data so as to guide the vehicle over a corrective arc path from its position and bearing as determined by the navigation sections to the desired position and bearing as indicated by a stored path vector.

10 Claims, 7 Drawing Sheets

AUTOMATIC GUIDED VEHICLE SYSTEM

BACKGROUND OF THE INVENTION

Automatic guided vehicle system (AGVS) wherein a driverless vehicle is operated in a predetermined zone within a warehouse, industrial plant or the like are known. The driverless vehicle may carry a pay load such as a product to be delivered from one location to another, onboard robotics for performing a particular operation at a series of locations, and the like. Conventionally, such vehicles are guided over a series of tracks from one position to another wherein no steering mechanism is required onboard the vehicle. Various wire guided driverless vehicle systems are also known. Typically, such systems include a wire embedded in the ground, the wire carrying the necessary information for guiding the vehicle over the wire path.

The present invention is directed to an AGVS of the type which requires no tracks and no wires for guiding the vehicle. The probelm solved by the present invention is that of providing a vehicle with a self-contained navigation system for guiding the vehicle over any one of an almost infinite variety of paths initially prescribed by a base station computer. The system uses complementary onboard navigation systems for tracking vehicle position and bearing and for correcting vehicle position and bearing over selected arc segments, with no need for communication with the base station during navigation.

SUMMARY OF THE INVENTION

Automatic guided vehicle system for guiding a driverless vehicle within a predetermined zone divisible into coordinate positions, comprising a driverless vehicle provided with a steering mechanism and a drive controller for controlling the steering mechanism so as to guide the vehicle within the zone, plural beacons distributed within the zone outboard the driverless vehicle, a programmed computer onboard the vehicle having memory for storing a series of coordinate positions representing the positions of the beacons and a series of path vectors comprising position and bearing data, the vectors together representing a predetermined path of travel for the vehicle.

A first navigation section onboard the vehicle includes means for optically scanning the beacons and means for generating data signals indicating the position and bearing of the vehicle, and a second navigation section onboard the vehicle includes means for generating data signals indicating changes in position and bearing of the vehicle. Driver means onboard the vehicle are responsive to the data signals generated by the first and second navigation sections and to the stored path vectors for causing the drive controller to control the steering mechanism such that the vehicle follows the predetermined path of travel.

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
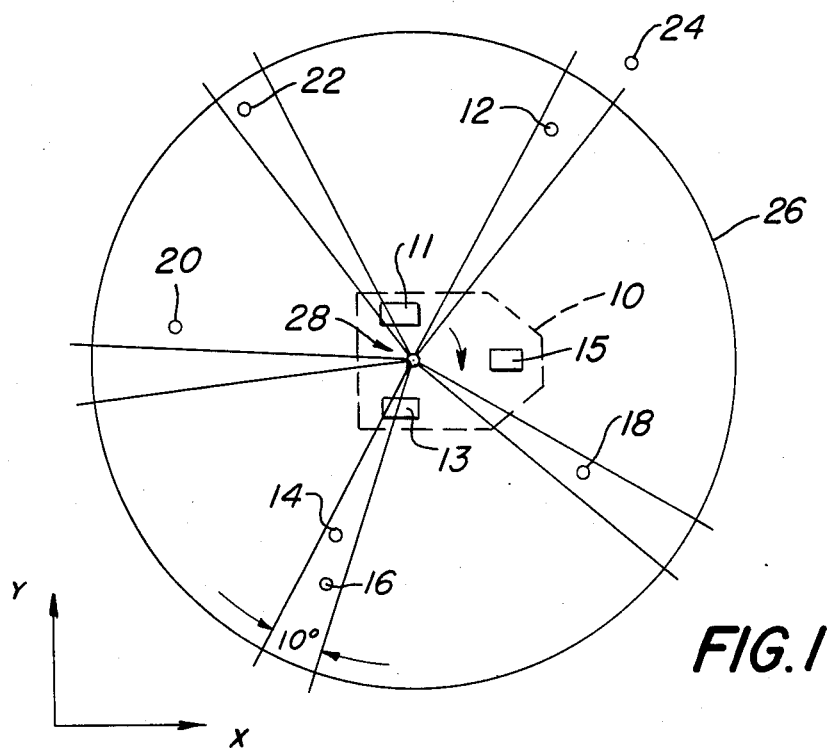
FIG. 1 is a diagram showing a driverless vehicle and one arrangement of beacons which may be scanned by the optical navigation section of the AGVS of the present invention.

Referring to the drawings, wherein like numerals indicate like elements, there is shown in FIG. 1 a diagram of a driverless vehicle 10 traveling in a zone containing plural beacons 12–24. Preferably, each beacon is in the form of an upright cylinder of retroreflecting foil. The zone is divisable into an x, y coordinate grid. Vehicle 10 is provided with free wheeling rear wheels 11, 13 and a motor driven and steered front wheels 15. The vehicle moves in arc segments over the x, y coordinate grid as described more fully hereafter. The circle 26 represents a range threshold with respect to the location 28 of the on board vehicle optics within which the system utilizes valid signals returned by the beacons. The return signal for a beacon lying outside the range threshold, such as beacon 24 in FIG. 1, is not utilized by the system.

Figure 2:
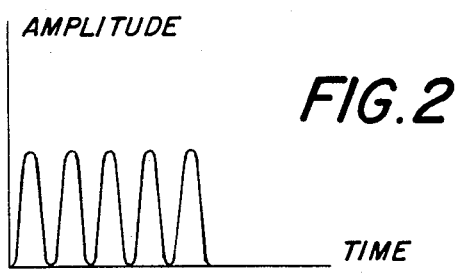
FIG. 2 is a waveform of the scanning laser beam power for the optical navigation section.

The system optics include a 2 mW CW, 780 nm collimated scanning (IR) laser beam of approximately 5 mm diameter. The beam is rotated continuously to scan substantially a 360° azimuth. The laser beam is amplitude modulated at 100 KHz as shown in FIG. 2 for noise immunity. A beacon provides a return signal reflecting the beam back to the system optics.

Figures 3, 7:
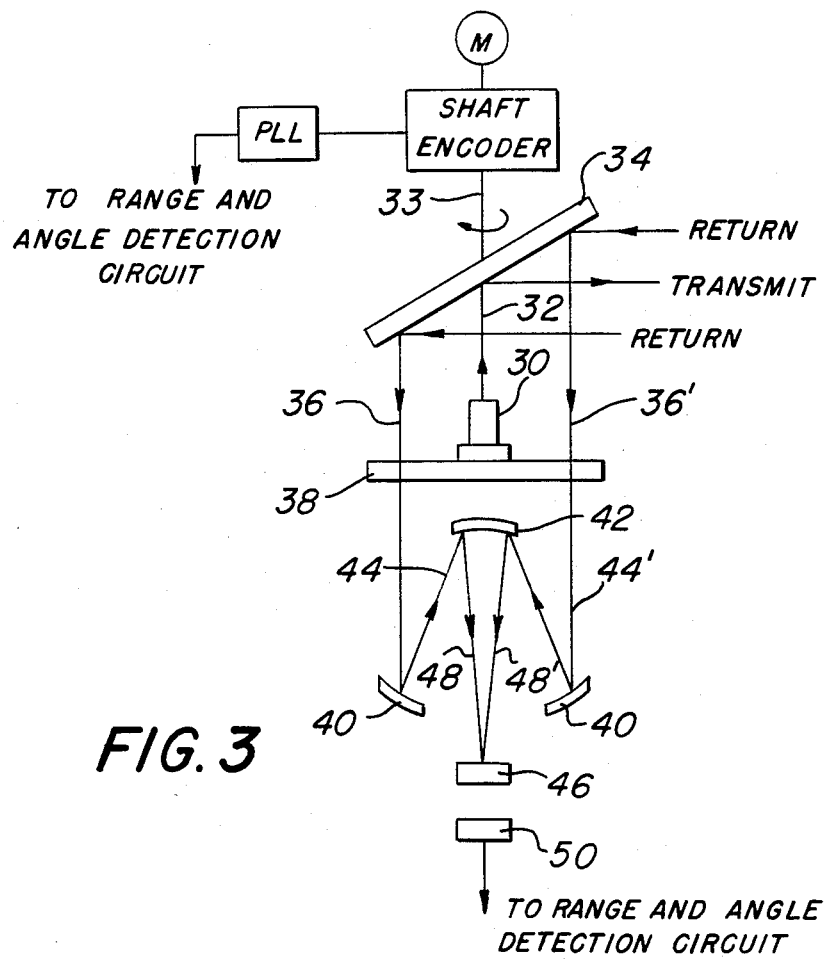
FIG. 3 is a diagram of the laser optics for the optical navigation section.
FIG. 7 is a diagram showing the technique for computing changes in vehicle position and bearing based on ground navigation section measurements.

A simplified diagram of the system optics is provided in FIG. 3. A collimated semiconductor laser 30 (Phillips CQL16 Collimator Pen) produces a beam 32. A rotating (gold) mirror 34 driven by a motor M directs the beam over 360° azimuth. Preferably, the mirror is rotated at one or two revolutions per second. An angular resolution of $0.3 \times 10^{-4}$ is obtained over 360° azimuth by means of a precision 1000 step optical shaft encoder coupled to the motor M shaft and a phase locked loop (PLL) which multiplies the encoder pulse frequency output. A beacon which is illuminated by the beam reflects the beam back to the rotating mirror. The rotating mirror reflects the beam over paths 36, 36' through a lens 38 to a parabolic mirror 40. Mirror 40 reflects the beam to another parabolic mirror 42 over paths 44, 44'. Mirror 42 directs the beam to an IR bandpass filter 46 over paths 48, 48'. The filtered beam is detected by photodetector 50. Up to sixteen beacon sightings can be processed per revolution of the optics by a computer onboard the vehicle as described hereafter. The processing is performed at the end of each revolution during a dead angle while the beam 32 is blocked.

The duration of a return signal is determined by the width of a beacon and is directly proportional to the range of the beacon to the vehicle as represented by the location 28 of the system optics. A beacon lying near the range threshold 26, such as a beacon 22 in FIG. 1, will be illuminated by the beam for a longer period of time than a beacon which is located nearer the vehicle such as beacon 18. As a result, the duration of the return signal from beacon 22 will exceed the duration of the return signal from beacon 18 by an amount proportional to the difference in range to the vehicle. Thus, the width of the return signal represents apparent range between the beacon and vehicle.

Figure 4:
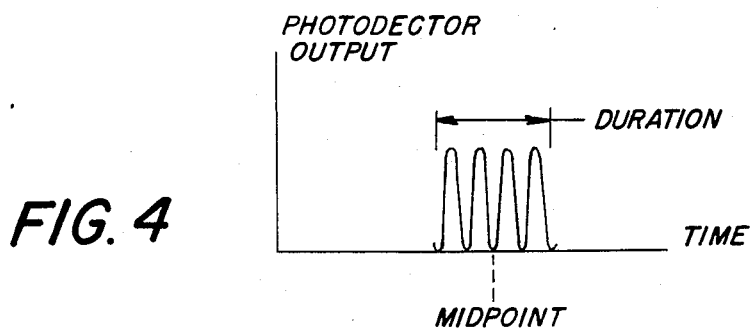
FIG. 4 is a waveform of a beacon return signal having a pulse width proportional to the range between the vehicle and beacon.

A typical photodetector output for a beacon return signal is shown in FIG. 4. The vehicle is provided with an onboard range and angle detection circuit 52 (FIG. 5) which measures the duration and midpoint of the photodetector output by counting phase locked loop pulses. Vehicle to beacon range, then, corresponds to a pulse count taken over the duration of the photodetector output. Angular position of the laser beam when a beacon is sighted corresponds to a pulse count at the midpoint of the photodetector output. This information, when obtained for at least three beacon sightings during a revolution, is used to compute vehicle position and bearing as described hereafter.

OPTICAL NAVIGATION SECTION

Vehicle position and bearing is determined by an on board optical navigation section 103. See FIG. 5. The vehicle to beacon range and beam angle measurements are obtained for at least three valid beacon return signals to determine vehicle position and bearing. Each vehicle to beacon range measurement is compared to a stored range threshold value in the computer memory. The threshold is indicative of range 26. The threshold may be constant or it may be increased if less than three beacon sightings are obtained during a revolution. The comparison is made by circuit 52 to discriminate between valid and invalid beacon sightings. Thus, detection circuit 52 does not provide range outputs for a signal returned by a beacon lying outside the range threshold such as a beacon 24 in FIG. 1. Although circuit 52 does provide a range output for a signal returned by a beacon inside the range threshold, this does not necessarily produce a valid beacon sighting for use in determining vehicle position. Thus, it must also be determined that the beacon lies within a 10° expected scan sector computed by the "triangulation and bearing" section 53 of a programmed computer 100 onboard the vehicle.

The primary function of the "triangulation and bearing" section is to compute the position of the vehicle in x, y coordinates as described more fully hereafter. However, the triangulation and bearing section also discriminates between valid and invalid beacon sightings based in part on the apparent beacon angle (as indicated by the midpoint data outputed by the beacon range detection circuit 52). To determine whether a beacon sighting is valid, the triangulation and bearing section computes the angle between the vehicle and each beacon based on the estimated vehicle position (x, y) computed in the preceding scan and on the positions (x, y) of the beacons. The apparent beacon angle, as indicated by the midpoint data, and the computed beacon angles are referenced to the center line of the vehicle. The position (x, y) of each beacon is known as it is part of a beacon map which is loaded into the vehicle memory 101 prior to operation. Preferably, the vehicle is provided with a radio link (RS232) to a base station transmitter which transmits the beacon map data to the vehicle computer.

Figure 10:
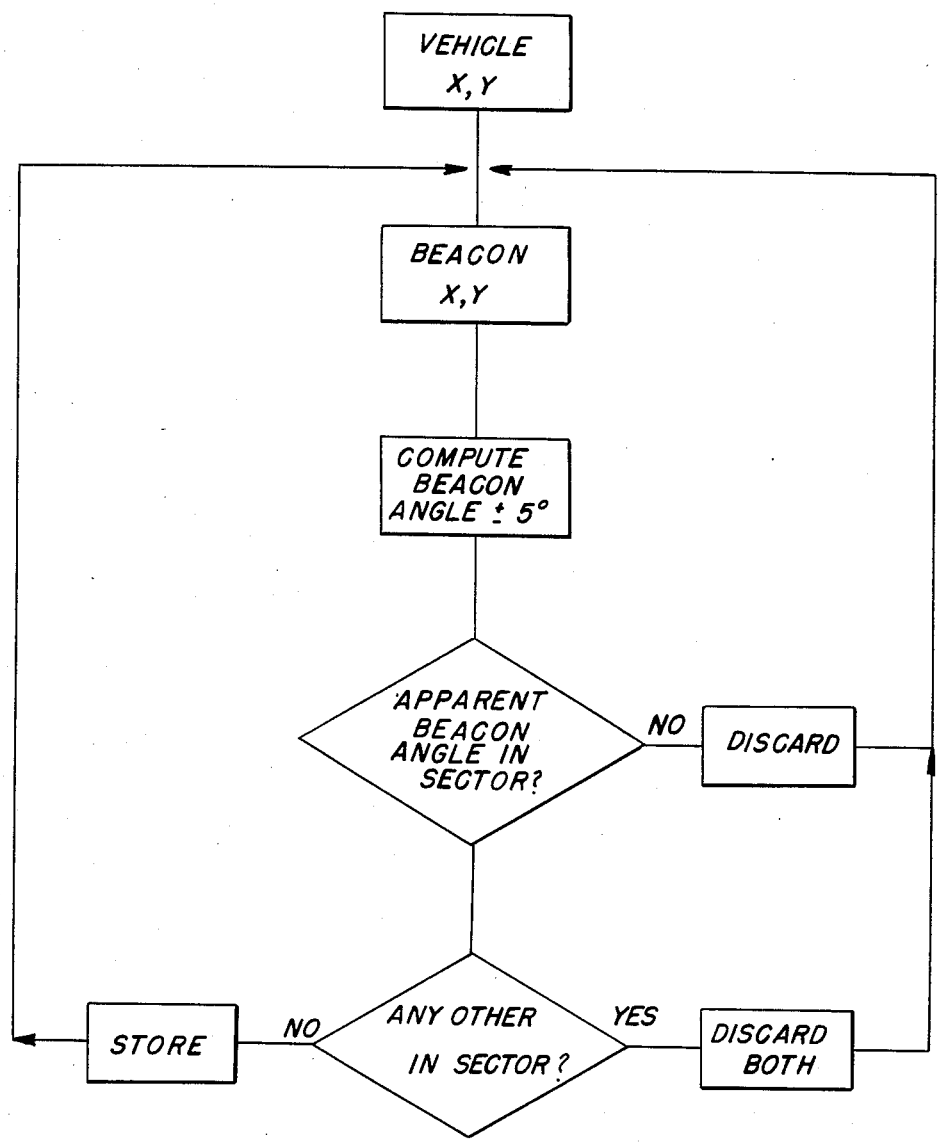
FIG. 10 is a flow chart showing the triangulation and bearing section algorithm for discrimination between beacon sightings.
Figure 12A:
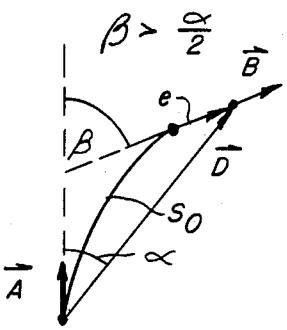
FIGS. 12(a)–(e) are diagrams showing various classes of arc path corrections.
Figure 12B:
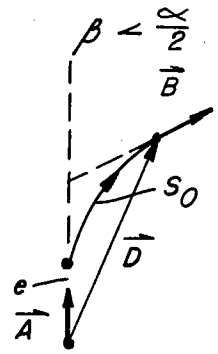
Figure 12C:
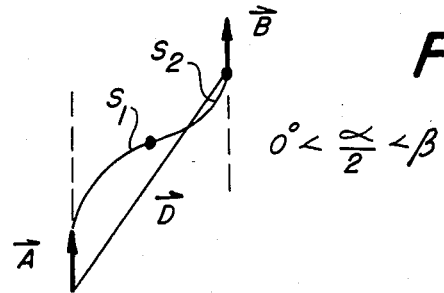
Figure 12D:
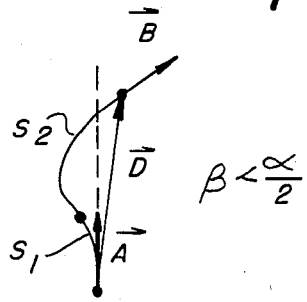
Figure 12E:
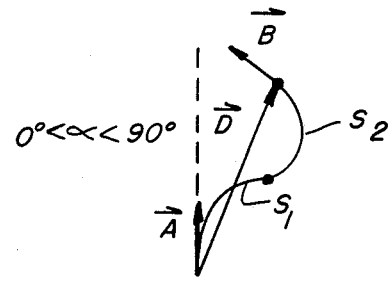

After computing the beacon angle, the triangulation and bearing section adds ±5° to the computation to define a 10° sector around each computed beacon angle. The computer determines whether the apparent beacon angle lies within a 10° sector. If so, the apparent beacon angle is used to compute vehicle range and bearing as described hereafter. If not, the data is discarded. In addition, multiple beacon sightings within the same 10° scan sector, such as beacons 14, 16 in FIG. 1, are discarded. Also, if beacons 14, 16 overlap along a radius, their return signals are discarded as they will merge into a single photodetector output signal which indicates a single beacon but at a location which does not correspond to the location of either beacon 14 or 16 on the beacon map. The triangulation and bearing section algorithm (for discriminating between valied and invalid beacon sightings) is shown in flow chart form in FIG. 10. Valid beacon sightings, such as those provided by beacons 12, 18, 22, are processed by onboard computer 100 (triangulation and bearing section) to compute vehicle position and bearing.

Figure 6:
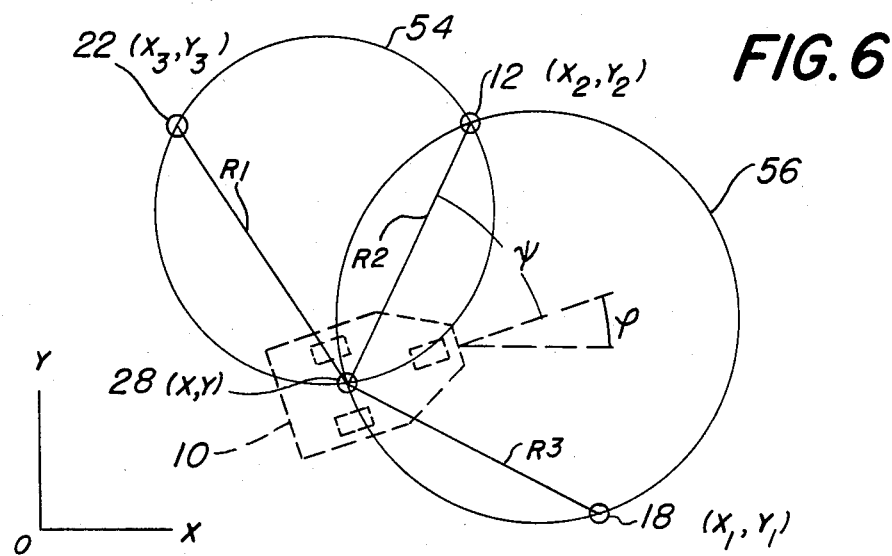
FIG. 6 is a diagram showing the technique for computing vehicle position and bearing based on optical navigation section measurements.

The vehicle onboard computer 100 may be an Intel 86/05 SBC with numeric processor; it is programmed as described hereafter to compute vehicle position by performing a triangulation computation based on at least three valid beacon sightings during a 360° scan i.e. one revolution of the optics. The algorithm for performing the triangulation is shown in FIG. 6.

Beacons 22, 12 lie on an imaginary circle 54. Beacons 12, 18 lie on another imaginary circle 56. Since the locations of beacons 12, 18, 22 are known, vehicle position is computed by the triangulation and bearing section according to the following algorithm:

$$x = 2\frac{(y_2 - y_1 + x_2/m + x_{01}m)}{m + 1/m} ; y = \left(\frac{x_2 - x}{m}\right) + y_2$$

where $x_1$, $y_1$, are the stored x-y coordinates for beacon 18; $x_2$, $y_2$ are the stored x-y coordinates for beacon 12; $m = (y_{02} - y_{01})/(x_{02} - x_{01})$ is calculated by the computer; $x_{01}$, $y_{01}$ are the x-y coordinates for the center of circle 54; and $x_{02}$, $y_{02}$ are the x-y coordinates for the center of circle 56.

The x-y coordinates for the center of circles 54, 56 are calculated by the computer according to the following algorithms:

$$x_{01} = \frac{x_1 + x_2}{2} \pm \frac{L_{12}\cot\alpha_{12}}{2\sqrt{1 + m_{12}^2}}$$

-continued $$y01 = \frac{y_1 - y_2}{2} \pm \frac{L_{12}\cot\alpha_{12}}{2\sqrt{1 + m_{12}^2}}$$

$$x02 = \frac{x_2 + x_3}{2} \pm \frac{L_{23}\cot\alpha_{23}}{2\sqrt{1 + m_{23}^2}}$$

$$y02 = \frac{y_2 - y_3}{2} \pm \frac{L_{23}\cot\alpha_{23}}{2\sqrt{1 + m_{23}^2}}$$

where $L_{12}$ is the computed distance between the known locations of beacons 12, 18 and $L_{23}$ is the computed distance between the known locations of beacons 12, 22; $\alpha_{12}$ is the included angle between any point on circle 56 and the known locations of beacons 12, 18; $\alpha_{23}$ is the included angle between any point on circle 54 and the known locations of beacons 12, 22; $m_{12}$ is computed as $(y_2 - y_1)/(x_2 - x_1)$; and $m_{23}$ is computed as $(y_3 - y_2)/(x_3 - x_2)$.

Once the coordinate position of the vehicle has been determined, the bearing $\phi$ of the vehicle is computed by the triangulation and bearing section 53. The algorithm for computing vehicle bearing $\phi$ (using zero bearing as the x-axis in FIG. 6) may for example be given by:

$$\phi = \tan^{-1}\left(\frac{y_2 - y}{x_2 - x}\right) - \psi_2$$

where $\psi_2$ is the beam angle (referenced to vehicle center line or axis) as detected by circuit 52 when beacon 12 is sighted.

From the foregoing, it can be appreciated that the sytem optics, range and beacon angle detection circuit 52 and triangulation and bearing section 53 of the onboard computer comprise an active optical navigation section 103 for the vehicle. In this context, a "navigation" system means a system that keeps track of vehicle position as compared with a "drive" system which steers a vehicle towards a destination point.

GROUND NAVIGATION SECTION

A second passive navigation section 105 is provided onboard the vehicle as well. The purpose of the ground navigation section is to provide current vehicle position and bearing information to the drive sytem (described hereafter) since the optical navigation section computations of vehicle position and bearing are performed only once per scan or revolution of the laser beam. In addition, the ground navigation section permits the vehicle to be steered temporarily without loss of orientation, despite the lack of any position or bearing information from the triangulation and bearing section which may be due for example to the failure to sight any beacons over one or more revolutions of the laser beam.

Figure 5:
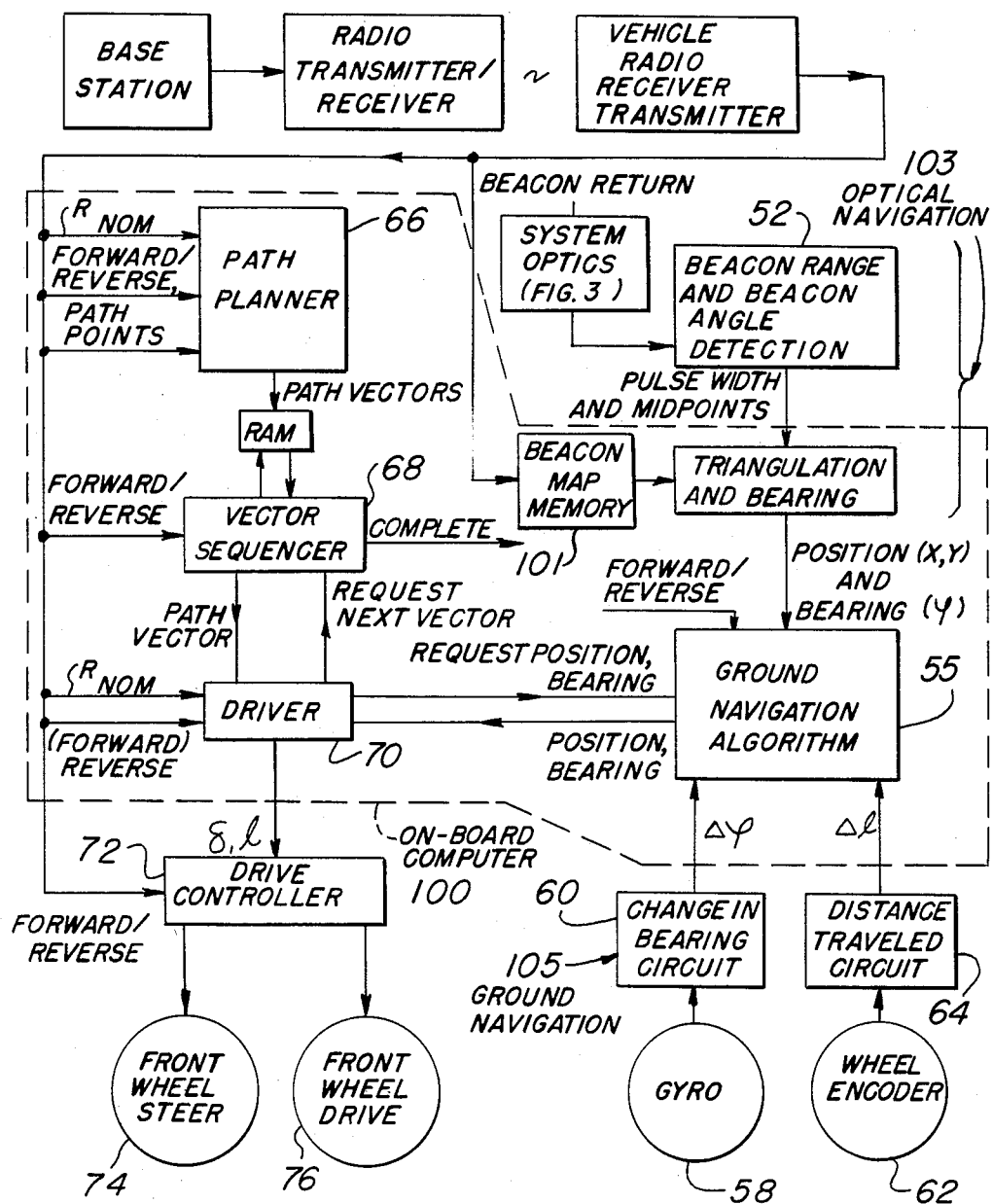
FIG. 5 is a block diagram of the AGVS of the present invention.

Referring to FIG. 5, the ground navigation section 105 comprises a gyrocompass 58 (King Radio KG 102A) having zero north and a resoltuion of 0.25° by way of example, a "change in bearing" circuit 60 which generates a signal $\Delta\phi$ indicative of change of bearing of the vehicle based on the gyrocompass output, an optical (wheel) encoder (odometer) 62 coupled to the shaft of the vehicle's front wheel 15, and a "distance traveled" circuit 64 which provides a signal $\Delta l$ indicative of an icremental distance traveled by front wheel 15 based on the wheel encoder output. The outputs of circuits 60, 64, which together indicate measured change in bearing and distance traveled by the vehicle, are fed to the onboard computer wherein they are used by the software "ground navigation algorithm" section 55. The optical and ground navigation sections 103, 105 are in a sense merged in the ground navigation algorithm section 55.

The geometry of change in bearing $\Delta\phi$ and wheel travels $\Delta l$ (over an arc path) are shown in FIG. 7. In FIG. 7, vehicle position and bearing as computed by triangulation and bearing section 53 are designated x, y and $\phi$. The ground navigation algorithm section 55 includes a counter which counts pulses at the output of change in position circuit 64, each pulse representing an increment of front wheel travel $\Delta l$. The variable $\Delta n$ is the pulse count during the time interval required for the vehicle to undergo an incremental change in bearing $\Delta\phi$ equal to the resolution of the gyrocompass, e.g. 0.25°. Typically, the count $\Delta n$ varies within a range correspond to front wheel travel of 0.005 inch (small radii of curvature) to 0.32 inch (large radii of curvature). The change in vehicle position ($\Delta x$, $\Delta y$) during an incremental change in bearing ($\Delta\phi$) are computed in the ground navigation alogorithm section according to the following algorithms:

$$\Delta x = \sqrt{\Delta l^2 - \left(\frac{L\Delta\phi}{\Delta n + \frac{1}{2}}\right)^2} \cos\phi = f_1(\phi, \Delta n)$$

$$y = \sqrt{\Delta l^2 - \left(\frac{L\Delta\phi}{\Delta n + \frac{1}{2}}\right)^2} \sin\phi = f_2(\phi, \Delta n)$$

where $\Delta l$ is an increment of travel of the front wheel 15 as indicated by a pulse at the output of distance traveled in circuit 64; L is the known separation between the vehicle position point 28 (x, y) and the front wheel 15; $\Delta\phi$ is the incremental change in bearing equal to the resolution of the gryocompas as indicated by the output of the change in bearing circuit 60; and $\Delta n$ is the count of circuit 64 output pulses for the incremental change in bearing $\Delta\phi$. The functions $f_1(\phi, \Delta n)$ and $f_2(\phi, \Delta n)$ are separate look up tables in computer memory, for example two 256K bit EPROMS, wherein $\phi$, $\Delta n$ specifies a storage location for $f_1$ (in one look up table) or $f_2$ (in the other look up table).

The computation of vehicle coordinate position and bearing, as indicated by triangulation and bearing section 53 once each revolution of the laser beam, corrects the ground navigation algorithm section computations. At the end of each revolution of the laser beam, a fresh computation of vehicle position (x, y) and bearing ($\phi$) is fed from triangulation and bearing section 53 to ground navigation algorithm section 55 so as to correct the computations of vehicle position and bearing. In between outputs from the triangulation and bearing section, any errors in the ground navigation algorithm section computations will therefore accumulate.

DRIVE SECTION

Steering of the vehicle is best explained with reference to FIGS. 5, 8-9 and 11-12. The computer software includes a path planner section 66, vector sequencer section 68 and driver section 70. The beacon map and a "primary" path of travel for the vehicle are entered by an operator at the base (remote) station. See FIG. 5. The base station is equipped with a graphics terminal by which the operator directly enters information containing "primary" path data in the form of a collection of path points and a nominal turning radius Rnom which the vehicle will use as described hereafter at the path corners. The information is transmitted through the radio data link to the onboard vehicle receiver which is coupled to the vehicle onboard computer 100. The path points represent x, y coordinate position information for a prescribed path of travel for the vehicle. The operator may also enter data to indicate desired vehicle velocity at each point.

Figure 8:
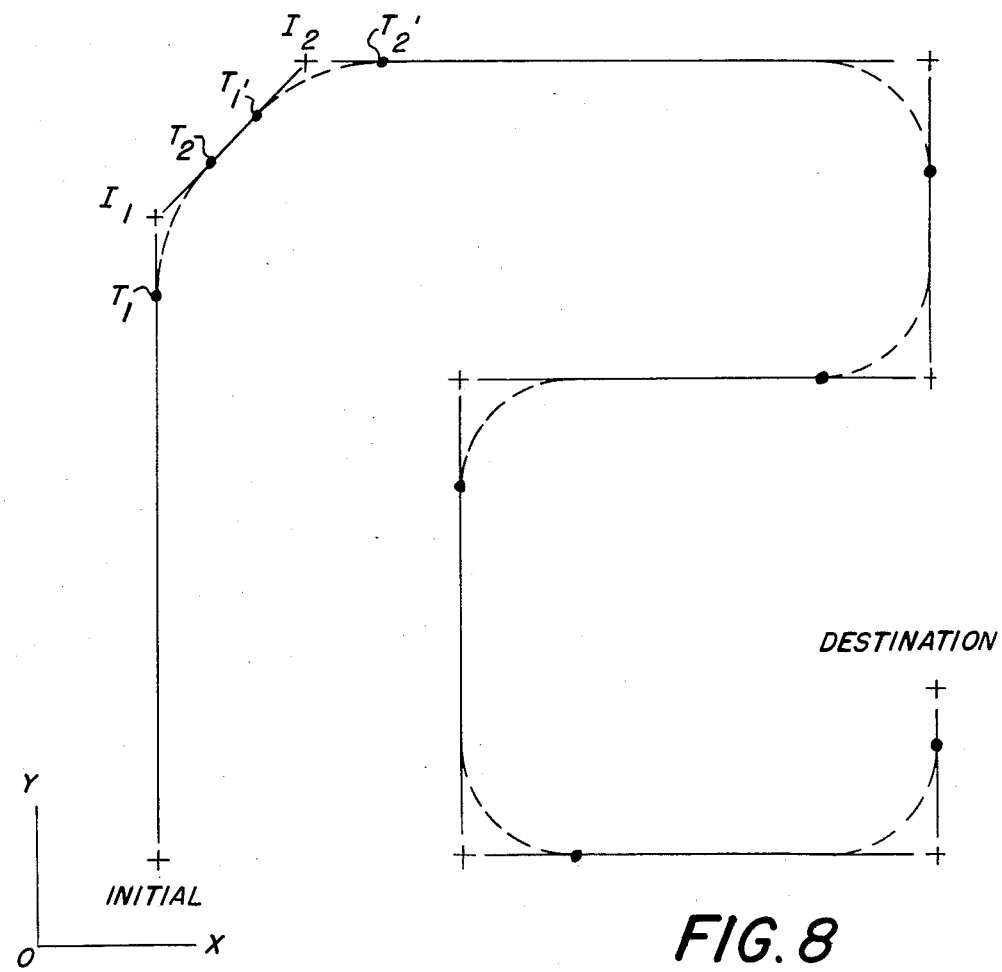
FIG. 8 is a diagram of a "primary" path of travel as defined by path points entered at the base station keyboard.
Figure 9:
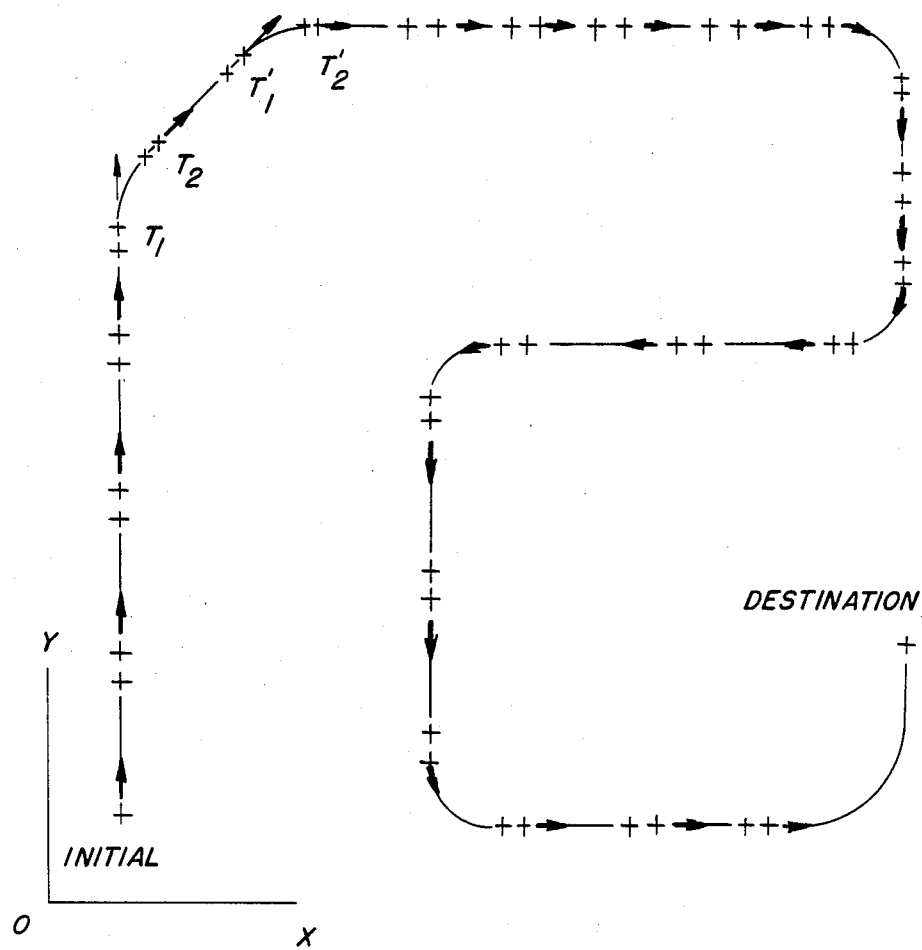
FIG. 9 is a diagram of the smoothed "primary" path of travel including "secondary" path vectors inserted by the computer.
Figure 11:
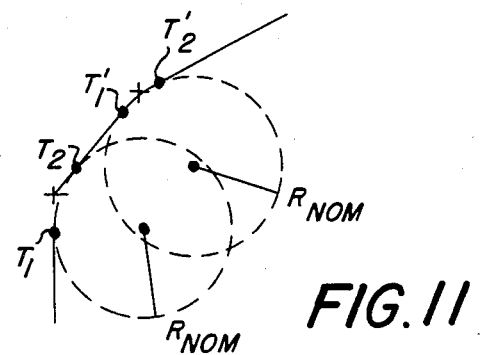
FIG. 11 is a diagram showing the curve fitting technique for smoothing each corner of the "primary" path of travel.

An exemplary path of travel entered at the base station is shown in FIG. 8 wherein "primary" path points, including the initial point, destination point, and all corner points are marked by the symbol "+". The path planner software section 66 checks the "primary" path points received from the base station and smooths each corner on the path by performing a curve fitting routine based on the radius of curvature Rnom as shown in FIGS. 8 and 11. The radius Rnom defines a circle whose center coordinates are computed by the path planner section such that the tangent points T1, T2 (or T1', T2') are located on the corner path as shown in phantom in FIG. 8. The tangent points are then entered as "secondary" points in replacement of the "primary" corner points. The result is the path shown in FIG. 9 wherein all corners have been smoothed. The path planner section then computes a set of "secondary" path points and vectors, as shown in FIG. 9, which define successive line segments each having a length no greater than a threshold distance ΔL. The "secondary" points are marked by the symbol "++" in FIG. 9.

The "secondary" points and vectors are shown in FIG. 9 and are inserted as follows. The path planner section inspects the end points for each straight line segment in the smoothed "primary" path and determines the length L of each segment. The planner then divides the length L by 2. If the result is less than or equal to the threshold distance ΔL, the "secondary" point position is the midpoint of the segment and a "secondary" vector (having same vector angle as the initial point) is inserted at the midpoint and stored in the appropriate sequential location in the onboard computer RAM. If the result exceeds the threshold, then the length L of the segment is divided by 3. If the result is then less than the threshold, two "secondary" points are selected within the segment, so as to divide the segment into three equal parts, and a "secondary" vector (having the same vector angle as the initial point) is stored at each point in the computer RAM. The algorithm for selecting the points within a segment is therefore given in general terms by:

$$L \div n \leq \Delta L$$

where L is the length of the line segment as defined by the "primary" line segment end points, and n is the integral divisor 2, 3, . . . . If the quotient is less than or equal to the threshold ΔL, then the segment is divided into n equal parts by appropriate placement of (n−1) "secondary" vectors which are then stored at the appropriate sequential locations in RAM. The value of ΔL for any particular path segment corresponds to the length of a double arc steering correction as described hereafter. "Secondary" path vectors are also inserted at each tangent point $T_1$, $T_2$, etc. marking a smoothed corner, the vector direction at each tangent point corresponding to the direction of the straight line segment connected to the tangent point.

The path vectors are retrieved from RAM in sequence, either forward from the initial point to the destination point or backward from the destination point to the initial point, by the vector sequencer section 68. The order (forward or backward) depends on whether the operator wishes the vehicle is to traverse the path shown in FIG. 9 in the forward or backward direction. The information is entered at the base station, by keyboard or CRT entry, and the base station computer generates a Foward command signal or a Reverse command signal in response. The signal is used by the vector sequencer section 68 of the onboard computer software to control the order of retrieval of the path vectors from RAM. The signal is transmitted over the radio link together with a Go or Stop command (also entered at the base station) and is received and sent to the onboard computer.

The vector sequencer 68 begins operation in response to a Go command signal. The vector sequencer retrieves each path vector in the order indicated by the forward/reverse signal. Each path vector is fed to the driver section 70 of the onboard computer software. Operation can be stopped at any time in response to a Stop command signal. The driver section 70 regularly interrogates the ground navigation algorithm section 55 and compares the position and bearing of a retrieved path vector to the actual position and bearing of the vehicle as indicated by the ground navigation algorithm section. The driver section executes a steering correction algorithm based on the deviation between retrieved and actual position and bearing, as shown in FIGS. 12(a)-(e).

In FIGS. 12(a)-(e), the vector $\bar{B}$ represents the path vector (position and bearing) retrieved from RAM by vector sequencer section 68. The vector $\bar{A}$ represents the actual (updated) position and bearing of the vehicle as outputted by the navigation update section. The difference in position between vectors $\bar{A}$, $\bar{B}$ is represented by the vector $\bar{D}$ which is determined by driver section 70.

The steering correction algorithm executed by driver section 70 is that of choosing two connecting arc segments and arranging the arc segments so that they define a smooth curve tangent at one end to the vector $\bar{A}$ (actual bearing at actual vehicle position) and tangent at the other end to the vector $\bar{B}$ (desired bearing at the desired path position). The curve selection falls into five classes designated (a)-(e) in FIG. 12 (and the mirror images of these classes) depending on the bearings indicated by vectors $\bar{A}$ and $\bar{B}$ and by vector $\bar{D}$. In the first class, class (a), the angle of vector $\bar{B}$ with respect to vector $\bar{A}$ is $\beta$ and it is greater than one-half the angle $\alpha$ between vector $\bar{D}$ and vector $\bar{A}$ whereby the connecting arcs are selected by the steering correction algorithm, an arc $S_o$ and a straight line segment e. The straight line segment e is itself considered as an arc having an infinite radius of curvature. In the second class, class (b), the angle $\beta$ is less than $\alpha/2$ whereby the connecting arcs selected are the straight line segment e and the arc $S_o$. In the third class, class (c), the angle $\alpha$ is between 0° and twice $\beta$ whereby the connecting arcs selected are arcs S1, S2 of like radius of curvature and connected at an inflection point. In the fourth class, class (d), the angle $\beta$ is less than one half $\alpha$ and the connecting arcs selected are arcs S1, S2 of like radius of curvature and connected at an inflection point. In the fifth class, class (e), the angle $\alpha$ is between 0° and 90° and the connecting arcs selected are arcs S1, S2 of like radius of curvature connected at an inflection point.

The driver section 70 outputs the necessary digital data for the vehicle drive controller 72 to operate the vehicle steering mechanism 74 so as to turn the front wheel 15 and thereby move the vehicle over the desired path i.e. so that the vehicle reaches the position of vector $\vec{B}$ with the bearing of vector $\vec{B}$. The driver section output includes the steering angle command $\delta$ which must be executed to move the vehicle along the two arc segments ($S_o$, e, or e, $S_o$ or S1, S2) and the arc length command l, indicating the length of the arc ($S_o$, e, S1 or S2) to be covered by the front wheel 15, the geometry being shown in FIG. 7. The algorithm for computing the commands $\delta$ and l are given by:

$$\delta = \tan^{-1}(L/R)$$

$$l = \sqrt{1 + (L/R)^2} \, S$$

where L and R are the distances shown in FIG. 7 for each arc and S is the arc length over which the vehicle is to travel i.e. arc lengths $S_o$, S1 or S2 as shown in FIG. 12. The value of L is known and the values for R and S are computed for each class as set forth in Table 1 below:

TABLE 1

| Class of Turn in Figure 12 | R | S |
|---|---|---|
| (a) | $d/\tan\left(\frac{\alpha}{2}\right)$ | $S_0 = R\alpha$ <br> $e = h-d$ |
| (b) | $h/\tan\left(\frac{\alpha}{2}\right)$ | $S_0 = R\alpha$ <br> $e = d-h$ |
| (c) | $\dfrac{a}{\cos\alpha - 2\cos\psi_1 + 1}$ | $S_1 = R\psi_1$ <br> $S_2 = R(\psi_1 - \alpha)$ |
| (d) | $\dfrac{a}{2\cos\psi_2 - \cos\alpha - 1}$ | $S_1 = R\psi_2$ <br> $S_2 = R(\psi_2 + \alpha)$ |
| (e) | $\dfrac{a}{2\cos\psi_3 + \cos\alpha + 1}$ | $S_1 = R(\pi - \psi_3)$ <br> $S_2 = R(\psi_3 + \alpha)$ | where $$d = \frac{\vec{A}\cdot\vec{D} - |(\vec{A}\times\vec{D})_z||\vec{A}\cdot\vec{B}|/|(\vec{A}\times\vec{B})_z|}{|\tan\beta|}$$

$$h = \frac{|(\vec{A}\times\vec{D})_z||\vec{B}|}{|(\vec{A}\times\vec{B})_z|}$$

$$a = \frac{|(\vec{A}\times\vec{D})_z|}{|\vec{A}|}$$

$$\psi_1 = \cos^{-1}\left[\frac{\cos\alpha + \tan\beta\sin\alpha + 1}{2\sqrt{1 + (\tan\beta)^2}}\right] + \beta$$

TABLE 1-continued

| Class of Turn in Figure 12 | R | S |
|---|---|---|

$$\psi_2 = \cos^{-1}\left[\frac{\sin\alpha + \tan\beta\cos\alpha + 1}{2\sqrt{1 + (\tan\beta)^2}}\right] - \beta$$

$$\psi_3 = \cos^{-1}\left[\frac{\tan\beta\sin\alpha - \cos\alpha - 1}{2\sqrt{1 + (\tan)^2}}\right] - \beta$$

The drive controller uses the commands $\delta$, l to command the vehicle steering mechanism 74. The steering mechanism 74 turns the front wheel 15 so that the vehicle (point 28) travels along the computed arc segments as shown in FIGS. 12(a)–(e). In this manner, the vehicle is steered over the corrective double arc paths shown in FIGS. 12(a)–(e) so as to arrive at the position of vector $\vec{B}$ with the appropriate bearing. The driver section 70 monitors the distance traveled by the front wheel over the double arc path. When the distance remaining on the first arc falls to a stored limit, the first arc is completed while the driver section 70 selects the next double arc correction for the next path vector and transfers the new arc lengths and steering wheel angles to eight bit storage latches for use by the drive controller 72 in executing the next path correction. Data transfer to the latches is complete by the time the second arc is reached. The next path correction, then, is normally initiated upon completion of the first arc in the preceding path correction.

Figure 13:
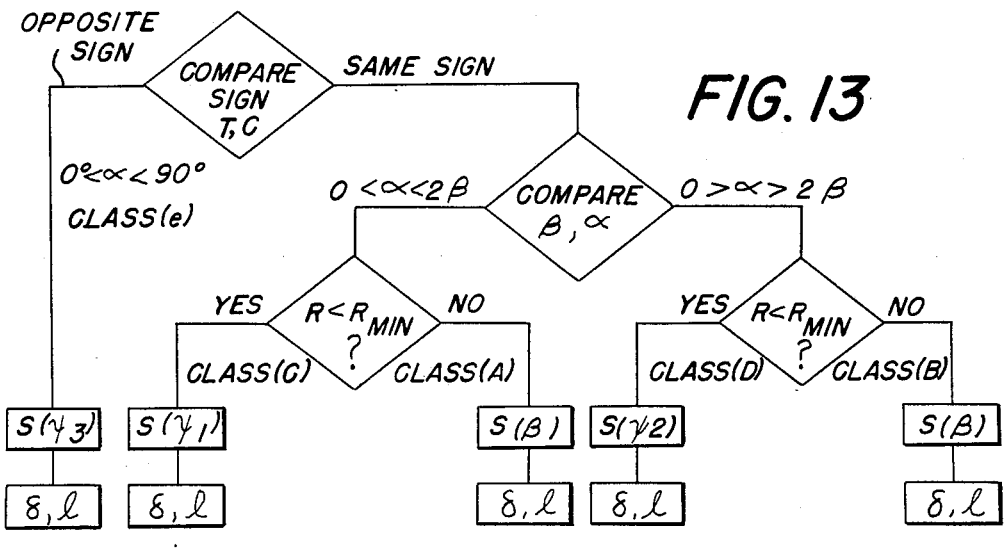
FIG. 13 is a flow chart showing the arc path correction routine.

A flow chart for computing the $\delta$, l commands is shown in FIG. 13. the quantities T, C are given by $T=(\vec{A}\times\vec{D})_z$ and $C=(\vec{A}\times\vec{B})_z$. In the "compare sign T, C" block, a determination is made as to whether the class of correction is class (e) or any one of classes (a)–(d). If the correction is a class (e) correction, the quantities T, C will be of opposite sign. Otherwise, they are the same sign. In the "compare $\beta$, $\alpha$" block, the particular class is determined as being (a) or (c) on the one hand or (b) or (d) on the other depending on the range within which the angle $\alpha$ falls. In the compare block "R $R_{min}$", the value of the turning radius R is compared to a preset limit $R_{MIN}$. If the turning radius falls below the preset limit, then a rough corner would be encountered using the class (a) or (b) corrective arcs. Accordingly, the routine for the class (c) or (d) corrective arcs is used instead.

Although the invention has been described in terms of a three wheeled vehicle having a motor drive, steered wheel and two free wheeling rear wheels, it should be understood that the invention encompasses front or rear wheel driven vehicles having other numbers of wheels as well. For example, two front wheels may be employed wherein the wheels are motor driven and mounted on a turnable carriage. In addition, although the invention has been described in terms of the retrieval of "secondary" path vectors bearing direction information at preselected points along the prescribed path of travel for the vehicle, it should be understood that the vectors may also include magnitude data indicating desired velocity of the vehicle at each preselected point on the path. The velocity data would then be used to control the speed of the drive motor for the wheels.

The present invention may be embodied in other specific forms without departing from the spirit or essential attributes thereof and, accordingly, reference should be made to the appended claims, rather than to the foregoing specification, as indicating the scope of the invention.

I claim:

1. Automatic guided vehicle system for guiding a driverless vehicle within a predetermined zone divisible into coordinate positions, comprising:

driverless vehicle provided with a steering mechanism and a drive controller for controlling the steering mechanism so as to guide the vehicle over arc path segments within the zone, plural beacons distributed within the zone outboard the driverless vehicle, memory onboard the vehicle for storing a series of coordinate positions representing the positions of the beacons and for storing a series of path vectors each comprising position and bearing data, said vectors together representing a predetermined path of travel for the vehicle, first navigation section onboard the vehicle including means for optically scanning said beacons and means for generating data signals indicating the position and bearing of the vehicle based on an optical scan of the beacons, second navigation section onboard the vehicle including means for generatiang data signals indicating changes in the vehicle position and bearing as indicated by said first navigation section data signals, and driver means onboard the vehicle and responsive to said data signals generated by said first and second navigation sections and to said stored path vectors for causing said drive controller to control said steering mechanism such that said vehicle follows said predetermined path of travel.

2. Automatic guided vehicle system according to claim 1 wherein said driver means includes means for causing said drive controller to control said steering mechanism such that said vehicle follows said predetermined path of travel in forward or reverse directions.

3. Automatic guided vehicle system according to claim 1 wherein said driver means includes means for calculating a corrective arc path for said vehicle based on the data generated by said first and second navigation sections and the position and bearing data indicated by said stored path vectors, and means for causing said drive controller to control said steering mechanism such that said vehicle follows said corrective arc path.

4. Automatic guided vehicle system according to claim 3 wherein said corrective arc path comprises a pair of arc segments.

5. Automatic guided vehicle system according to claim 1 wherein said first navigation section includes means for measuring the ranges between the vehicle and at least three of said beacons based on an optical scan of the beacons.

6. Apparatus according to claim 1 wherein said means for optically scanning said beacons includes a laser beam and means for rotating said laser beam over substantially 360° azimuth.

7. Automatic guided vehicle system according to claim 1 wherein said second navigation section includes means comprising a gyrocompass for measuring change in bearing of the vehicle and means including a wheel encoder for measuring distance traveled by the vehicle, and wherein said second navigation section means for generating data signals is responsive to the measurements of bearing change and distance traveled.

8. Automatic guided vehicle system for guiding a driverless vehicle within a predetermined zone divisible into coordinate positions, comprising:

driverless vehicle provided with a steering mechanism and a drive controller for controlling the steering mechanism so as to guide the vehicle over arc path segments within the zone, plural beacons distributed within the zone outboard the vehicle, memory on board the vehicle for storing a series of coordinate positions representing the positions of said beacons and for storing a series of path vectors each comprising position and bearing data, said vectors together representing a predetermined path of travel for the vehicle, navigation means on board the vehicle for generating data signals indicating vehicle position and bearing by electro-optically measuring the ranges of the vehicle with respect to a preselected number of said beacons, said navigation means including a gyrocompass for measuring change in bearing of the vehicle and a wheel encoder for measuring distance traveled by said steering mechanism, and wherein said data signals are generated based in part on the measured bearing change and travel distance, and driver means on board the vehicle for generating steering commands for said drive controller based on said data signals and on said stored path vectors so as to cause said vehicle to follow said predetermined path of travel.

9. Automatic guided vehicle system according to claim 8 wherein said driver means includes means for determining whether said vehicle is within a predetermined range of a stored path vector, and means for calculating a corrective arc path for said vehicle based on said data signals and said stored path vector.

10. Automatic guided vehicle system according to claim 9 wherein said corrective path comprises a pair of arc segments.

* * * * *